United States Patent [19]

Tozawa

[11] Patent Number: 5,167,156
[45] Date of Patent: Dec. 1, 1992

[54] LEVEL DETECTING DEVICE IN A PLASTIC FUEL TANK

[75] Inventor: Yoshio Tozawa, Ojima, Japan

[73] Assignee: Fuji Jukogyo Kabushiki Kaisha Corp., Tokyo, Japan

[21] Appl. No.: 828,205

[22] Filed: Jan. 30, 1992

[30] Foreign Application Priority Data

Mar. 7, 1991 [JP] Japan .................................. 3-20417

[51] Int. Cl.⁵ .......................................... G01F 23/32
[52] U.S. Cl. ..................................... 73/317; 340/625
[58] Field of Search ......................... 73/317; 340/625

[56] References Cited

U.S. PATENT DOCUMENTS

| | | | |
|---|---|---|---|
| 3,925,747 | 12/1975 | Woodward et al. | 73/317 |
| 3,968,896 | 7/1976 | Giacoletti et al. | 73/317 |
| 4,807,472 | 2/1989 | Brown et al. | 73/317 |
| 4,939,932 | 7/1990 | Ritzenthaler et al. | 73/317 |

FOREIGN PATENT DOCUMENTS 60-193421 12/1985 Japan ..................................... 73/317

Primary Examiner—William A. Cuchlinski, Jr.
Assistant Examiner—Diego F. F. Gutierrez
Attorney, Agent, or Firm—Beveridge, DeGrandi & Weilacher

[57] ABSTRACT

A level detecting assembly that features a level detecting device which includes a float hinged by an arm for displacement in accordance with a level of fuel in a plastic fuel tank. The level detecting device also includes a reference rod extending from a holder positioned in the plastic fuel tank. The tank is supported by a band on a motor vehicle. The lower end of the reference rod abuts the inside wall of the tank at or in the vicinity of the band, so that deformation of the tank is prevented, and precise level detection is achieved. Also, an elastic member is provided at the end of the reference rod. The elastic member is dimensioned and arranged for preventing the downwardly biased reference rod from damaging the inside of the tank bottom. The assembly also features an outer skin preferably formed of an elastic material positioned between the band or bands and the tank.

7 Claims, 3 Drawing Sheets

LEVEL DETECTING DEVICE IN A PLASTIC FUEL TANK

BACKGROUND OF THE INVENTION

1. Field of the Invention

The present invention relates to a level detecting device of bottom reference type in a plastic fuel tank for a motor vehicle.

2. Description of the Prior Art

In a level detecting device in a fuel tank for a motor vehicle, there has hitherto been developed (see the official gazette of the Japanese for Utility Model Registration Application Laid-open No. 193421/1985) a level detecting device of bottom reference type having a structure wherein a reference rod (a position setting arm) is secured integrally with a body by which the float arm of a float lying on a fuel surface is supported so as to be rotatable in a predetermined angular range. The body is supported by a spring and mounted on the fuel tank in the state of which the lower part of the reference rod abuts on the bottom of the fuel tank. The lower part of the reference rod presses the fuel tank bottom by virtue of a spring force, thereby intending to normally detect the height (level) of the fuel surface with reference to the fuel tank bottom on which the lower part of the reference rod abuts.

In recent years, plastic fuel tanks for motor vehicles have come into use. In general, the plastic fuel tank is mounted on the body of the vehicle by bands (usually, two bands) which are commonly made of steel.

With such a plastic fuel tank, the bottom thereof is secularly bulged and deformed by the fuel etc. contained therein. Therefore, when a level detecting device of the bottom reference type is applied to this tank, the reference point changes secularly. Also, the tank bottom is deformed by a stress ascribable to the structure in which the lower part of the reference rod is urged against the tank bottom by the spring. These disadvantages incur the problem that a stable performance of level detection is difficult to attain.

SUMMARY OF THE INVENTION

The present invention has for its principal object the development of a solution to the problem stated above.

In one embodiment of the present invention, there is provided a level detecting device in a plastic fuel tank mounted on a motor vehicle having, a band for supporting said tank at a bottom thereof, a holder attached on said bottom for supporting a generator for producing an electric signal in proportion to a level of fuel contained in said tank, a float hinged by an arm for being displaced in accordance with said level, and a reference rod extended from said holder to said bottom for setting a reference level. The improvement device of the present invention further comprises an elastic member attached on a lower end of said reference rod which downwardly pushes against the bottom of the tank. The elastic member acts as a cushion in preventing said rod from damaging an inside wall of said tank bottom. The invention preferably also includes an outer skin interposed between said band and said tank for covering said band. Also, the rod with attached cushion is dimensioned and arranged such that its lower end abuts on said inside wall of the tank in a vicinity of said band so as to exactly obtain said reference level without deforming said tank.

Owing to the above structure, in which the lower part of the reference rod is urged section of the bottom that is in contact with or in the vicinity of the tough band, the part against which the lower part of the reference rod is urged is not deformed, or the amount of deformation thereof is negligible even when the other general part of the tank bottom has been deformed secularly. Moreover, the tank bottom part is hardly deformed by the pressing force of the reference rod. Accordingly, a stable performance of level detection can be maintained for a long term.

PREFERRED EMBODIMENTS OF THE INVENTION

Now, embodiments of the present invention will be described with reference to the drawings.

Figure 1:
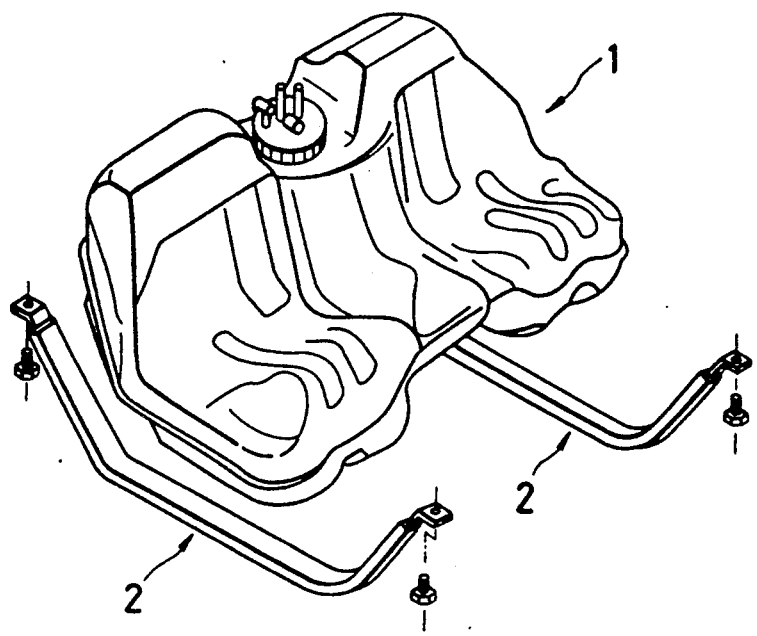
FIG. 1 an exploded perspective view showing a fuel tank and bands which support the present invention positioned within the interior of the tank illustrated.
Figure 2:
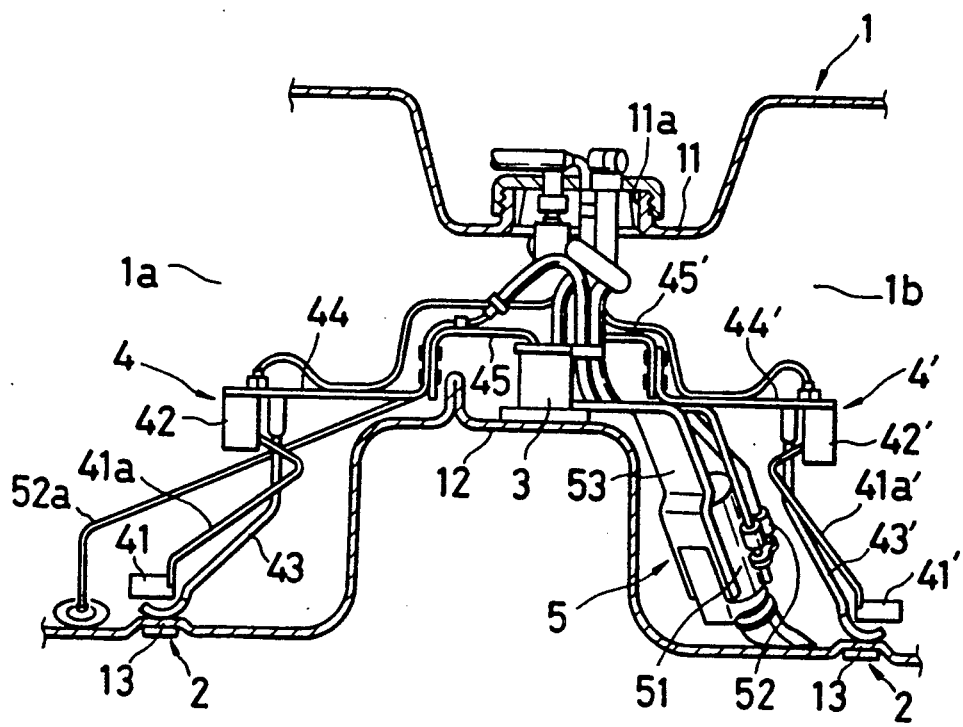
FIG. 2 is a sectional view of essential portions in FIG. 1, and shows the first embodiment of the present inventon.
Figure 4:
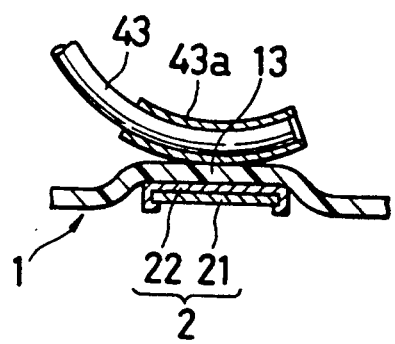
FIG. 4 is a sectional view taken along line X—X in FIG. 3.

Referring to FIGS. 1 and 2, numeral 1 designates a fuel tank which is constructed by the unitary molding of plastics. The fuel tank 1 is mounted on the body of a motor vehicle by two bands 2. As shown in FIG. 4, the band 2 is fabricated into a structure in which the surface of a band proper 21 made of a steel material is covered with an outer skin 22 made of a rubber material.

The fuel tank 1 has its top recessed downwards and its bottom protruded upwards at the central part thereof. Thus, the interior of the tank is partitioned into two, left and right chambers, one of which is a main side 1a and the other of which is a sub side 1b.

A fitting hole 11a for a fuel pump unit and level detecting devices is provided in a concave 11 at the top of the central part of the fuel tank 1, while a mounting base 3 for mounting the fuel pump unit and the level detecting devices is secured to a convex 12 projecting upwards at the bottom of the central part of the fuel tank 1.

The mounting base 3 is made of plastics. Although not illustrated in detail, it is formed with a plurality of slits extending vertically. The level detecting devices and the fuel pump unit can be mounted by pressedly inserting their brackets, to be described later, into the slits.

Numerals 4 and 4' indicate the main and sub level detecting devices, which detect the levels of fuel on the main side 1a and the sub side 1b, respectively.

The main level detecting device 4 includes a float 41, a case 42 which supports the float 41 through a float arm 41a so as to be turnable within a predetermined angular range, an electric signal generator (not shown) which is received in the case 42 and which produces an electric signal (for example, a resistance change signal) proportional to the turning angle of the float arm 41a, a reference rod 43, and a holder 44 which fixes and supports the case 42 and to which the upper end part of the reference rod 43 is secured. The device 4 is mounted in such a way that the bracket 45 is secured to the holder 44 by screws etc. and that it is pressedly inserted into the slit of the mounting base 3 and is locked by a holding stopper not shown, thereby to detect the fuel level on the main side 1a. The holder 44 is made of a leaf spring member such as spring steel plate or elastic stainless steel plate. When the bracket 45 has been attached to the mounting base 3 as stated above, the lower part of the reference rod 43 abuts on the bottom of the fuel tank, the holder 44 itself is elastically deformed, and an elastic force developed by the elastic deformation acts in the direction of urging the lower part of the reference rod 43 against the fuel tank bottom. Thus, the reference height of the float 41 relative to the bottom of the fuel tank 1 is set, and a precise fuel reserve can be detected.

The sub level detecting device 4' has quite the same structure as that of the main level detecting device 4, and the same components are denoted by affixing dashes to identical symbols. This sub level detecting device 4' detects the fuel level on the sub side 1b.

Figure 3:
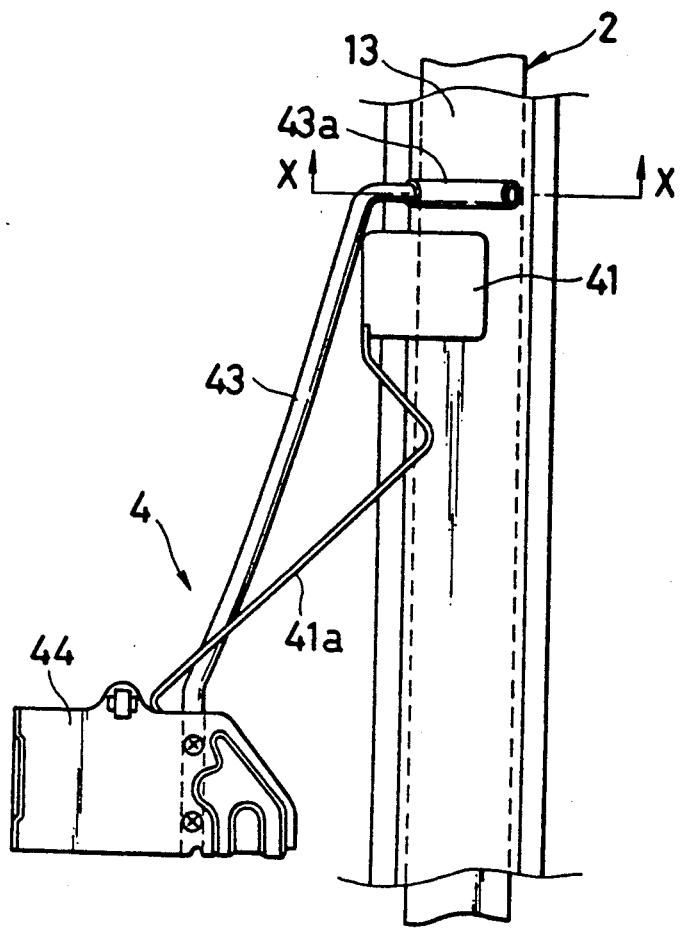
FIG. 3 is a plan view of essential portions in FIG. 2.

As shown in FIGS. 2, 3 and 4, the lower parts of the respective reference rods 43 and 43' of the main and sub level detecting devices 4 and 4' abut on the parts 13 of the fuel tank bottom kept by the bands 2. Symbol 43a denotes a cushion member made of rubber or plastics.

As stated before, in the plastic fuel tank, the bottom is secularly bulged and deformed downwards by the weight of fuel, etc. When the reference rod is held pressed on the corresponding part, the bottom is partially deformed still more by the pressing force. In consequence, the holder 44 is displaced downwards, and the reference height of the float 41 deviates downwards, so that a stable level detection becomes impossible.

Since the band 2 is made of a tough steel material covered with the rubber material, that part or section 13 of the bottom of the fuel tank 1 which is kept by the band 2 undergoes neither the secular bulging deformation nor the deformation ascribable to the pressing force of the reference rod 43. The lower part of the reference rod 43 is held in elastic contact with the part 13. Thus, the deviation of the reference height of the float 41 does not take place, and stable level detection can be achieved for a long time.

Besides, at the bottom part vicinal to the part 13 kept by the band 2, the amount of secular bulging deformation is very small, and the deformation ascribable to the pressing force of the reference rod 43 is slight. It is therefore allowed to adopt the structure in which the lower part of the reference rod 43 is held in elastic contact with the bottom in the vicinity of the part 13.

By the way, in FIG. 2, numeral 5 represents a fuel pump unit, which includes the fuel pump 51, a transfer pump 52, the bracket 53 for attaching and supporting these constituents 51 and 52, and pipes such as a delivery pipe. The unit 5 is so mounted that the bracket 53 is fixed to the mounting base 3 by the pressed insertion. The fuel on the sub side 1b is supplied to an internal combustion engine by the fuel pump 51. Also, when a level difference has developed between the main side 1a and the sub side 1b, the transfer pump 52 is actuated to transfer the fuel on the main side 1a to the sub side 1b through the transfer pipe 52a.

Figure 5:
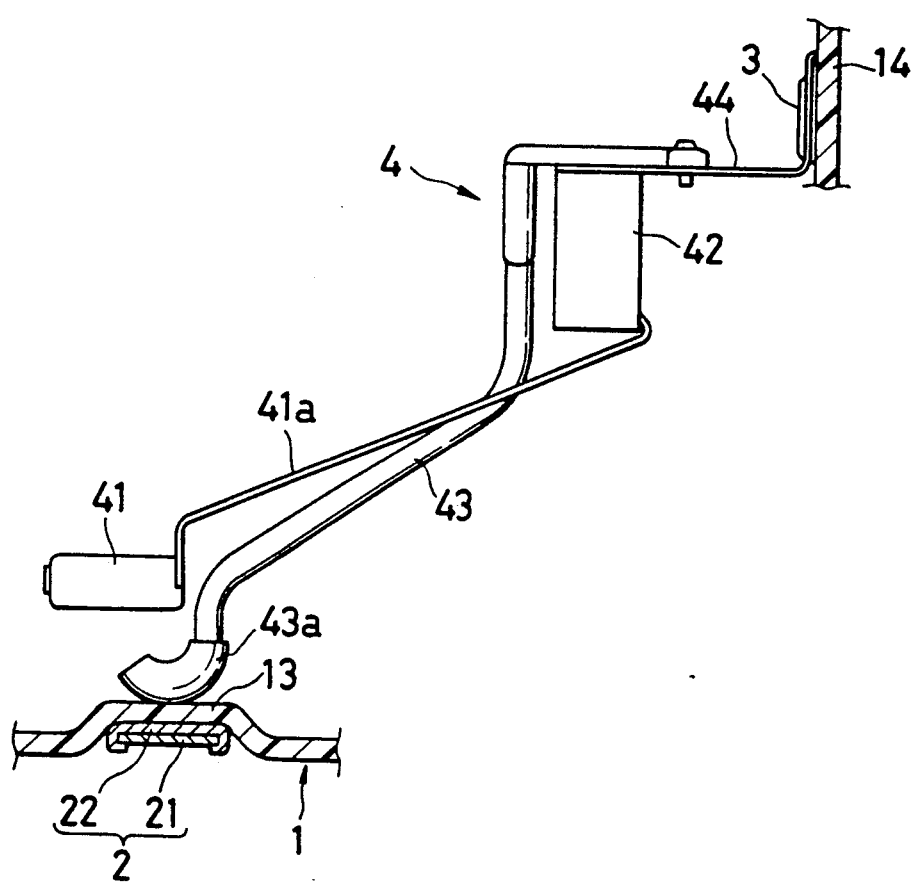
FIG. 5 is a sectional view of essential portions showing the second embodiment of the present invention.

FIG. 5 shows another embodiment of the present invention. In this example, a mounting base 3 is disposed on the vertical wall 14 of a plastic fuel tank 1, and a holder 44 is directly attached and fixed to the mounting base 3. Also in this case, the same functions and effects as those of the embodiment in FIGS. 1 thru 4 can be attained by the structure in which the lower part of a reference rod 43 secured to the holder 44 is held in elastic contact with the part 13 of a fuel tank bottom kept by a band 2 (or the vicinity thereof).

In FIG. 5, the same numerals as in FIG. 2 denote identical components.

The first embodiment illustrated in FIGS. 1 thru 4 exemplifies the construction in which the interior of the fuel tank 1 is partitioned into the main side 1a and the sub side 1b, and in which the main and sub level detecting devices 4, 4' are respectively provided on the main side 1a and the sub side 1b. However, the present invention is also applicable to a construction in which a single level detecting device is installed in the fuel tank 1.

In addition, both the first embodiment and the second embodiment shown in FIG. 5 exemplify the construction in which the holder 44 is a leaf spring member such as a leaf spring formed of a spring steel plate, and in which the elastic restoring force of the holder 44 itself is utilized as the pressing spring force of the reference rod 43. This construction has the advantages that the number of components may be small and that the number of assembling steps can be reduced. However, the present invention is applicable to a level detecting device of bottom reference type having any other construction. For example, a suitable construction is one in which a box-shaped holder to which a float 41, an electric signal generator for producing an electric signal proportional to the displacement of the float, etc. are attached and to which a reference rod 43 is secured is turnably mounted on the inside wall part of a fuel tank through a shaft, and in which a spring is retained so as to urge the holder in the direction of pressing the reference rod against the bottom of the tank.

As described above, according to the present invention, a level detecting device of bottom reference type in a plastic fuel tank is endowed with a structure in which a reference rod is held in elastic contact with a tank bottom part kept by a band for mounting the plastic fuel tank on a vehicle body or with the vicinity thereof. Thus, the level detecting device is hardly affected by the secular bulging deformation of the tank bottom attributed to the weight of fuel, etc., and the deformation of the tank bottom attributed to the pressing force of the reference rod is not involved. Therefore, a stable level detection can be achieved for a long term, and the present invention can bring forth great effects in practical use.

What is claimed is:

1. A level detecting assembly for use with a plastic fuel tank mounted on a motor vehicle having a band for supporting said tank at a bottom thereof, comprising:
   a level detecting device which includes a holder supported by said tank, a float hinged by an arm for displacement in accordance with a level of fuel in said tank, and a reference rod extended from said holder to said bottom for setting a reference level, and said level detecting device comprising an elastic member attached on a lower end of said reference rod, said elastic member being dimensioned and arranged for preventing said reference rod from damaging an inside wall of said bottom; and
   an outer skin interposed between said band and said tank for covering said band;
   wherein said lower end abuts on said inside wall in a vicinity of said band so as to obtain said reference level without deforming said tank.

2. A level detecting assembly as defined in claim 1, wherein said elastic member is a cushion member which is made of a material selected from the group consisting of rubber and plastics.

3. A level detecting assembly as defined in claim 1, wherein said outer skin is made of rubber.

4. A level detecting assembly as recited in claim 1 further comprising a mounting base attached to said tank and a bracket extending from said mounting base and wherein said holder is attached to said bracket so as to be indirectly supported by said tank.

5. A level detecting assembly as recited in claim 1 wherein said holder is attached directly to said tank as to be in contact with an interior surface of said tank.

6. A level detecting assembly as recited in claim 1 wherein said holder includes a leaf spring.

7. A level detecting assembly as recited in claim 1 further comprising a case which is attached to said holder, and said arm being rotatably supported by said case.

* * * * *